Patented July 29, 1952

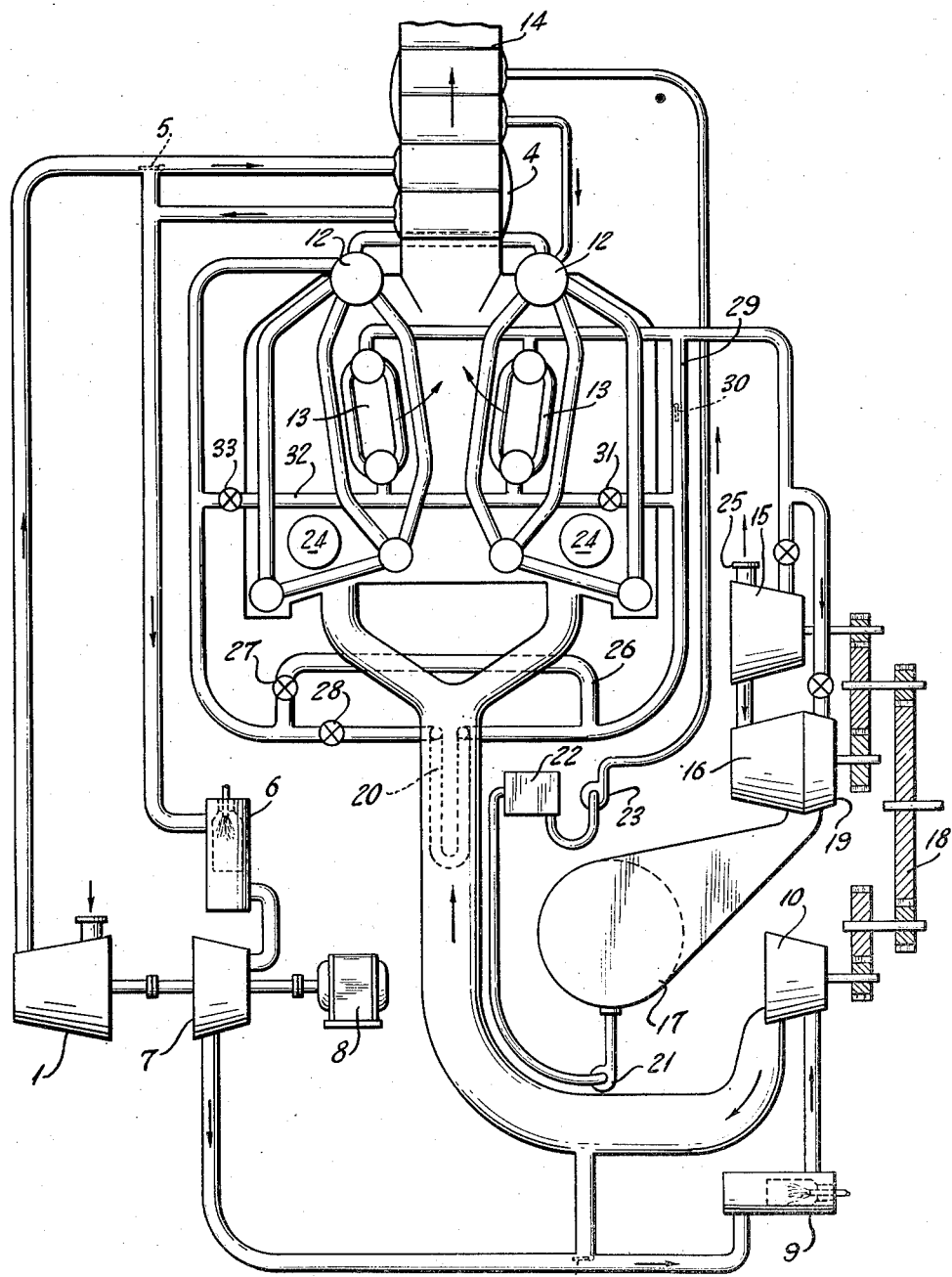

2,604,755

UNITED STATES PATENT OFFICE 2,604,755

COMBINED GAS AND STEAM TURBINE PLANT USING BURNER IN GAS TURBINE EXHAUST TO HEAT STEAM

Vilhelm Fredrik André Nordström, Stockholm, and Dimitrij Andrejevitch Morosoff, Enskede, Sweden, assignors to De Laval Steam Turbine Company, Trenton, N. J., a corporation of New Jersey Application July 7, 1949, Serial No. 103,488
In Sweden December 23, 1948

8 Claims. (Cl. 60—39.18)

1

It is known that a lot of steam is consumed on all ships for other purposes than for the power generation proper. The heat generated on ordinary cargo-steamers is mainly used for heating the rooms for the staff, for use in the galley, for baths and so on. This consumption of heat is not so great that it calls for any particular consideration. On old cargo-steamers the steam required for heating purposes has usually been taken direct from the steam boiler and passed through a reducing valve. On Diesel-driven ships a so-called donkey boiler has, as a rule, been installed for such purposes. However, there is a group of ships where the consumption of heat, in addition to that required for the power generation proper, is of such a value that it calls for more particular consideration. This group comprises whaling ships, tankers and the like.

When the cargo of the ship consists of viscous oil, it must be heated to a certain temperature (in certain cases up to 40° C.), so that the oil can be pumped readily and quickly. During the cold season and in northern seas it is absolutely necessary to heat the oil in order that it shall be possible to pump it at all. In tank vessels are provided with Diesel engines for the propulsion, it is necessary to install a very large steam boiler plant for heating the cargo. As an illustrative example it may be mentioned that a tank vessel of about 16,000 deadweight tons generally is provided with two Scotch steam boilers capable of delivering about 10 tons of steam per hour, when necessary, for heating the cargo. During such heating periods it must, thus, be calculated with a consumption of fuel to the Diesel engine in the form of Diesel oil as well as to the steam boiler plant in the form of fuel oil.

If instead of Diesel engines a steam plant is used for the propulsion of the ship, the boiler plant need only be increased a little beyond what is necessary for the power generation for the propulsion. Such an arrangement must absolutely be cheaper and simpler than the installation of special steam boilers for heating purposes.

As the steam pressure in the boilers generally is considerably higher than that corresponding to the steam temperature required for heating purposes, the steam is allowed to work in one or more expansion stages of the steam power engines and its pressure is reduced to a value suitable for the bleeding for heating purposes, thus, at the same time some of the heat content of the steam for the power generation.

The heat quantity taken out in this manner for the power generation then works with a very

2 high thermal efficiency because the greatest part of the losses—the condenser loss—is eliminated, and those losses which arise due to the steam power engine being incapable of completely utilizing the available heat drop, are returned to the steam in the form of friction or lost heat.

The above statements do not apply only to heat and power plants on ships but also to stationary plants, e. g. for such industries as cellulose and textile mills where great amounts of power and steam heat are required.

Even in a combined gas and steam power plant, e. g. of the type described in our co-pending U. S. application Serial No. 25,356, filed May 6, 1948, and comprising a gas power engine unit and a steam power engine unit, the exhaust gases from the gas power unit being utilized for the steam generation in the steam power unit, steam may be drawn off in the same manner as in pure steam plants.

If in a combined gas and steam plant some of the steam is drawn off for heating purposes and it is still desired to obtain the same power from the power plant, this cannot be attained unless additional fuel is supplied to the steam boiler so that the additional amount of heat which is required for heating purposes, is supplied to the plant. This results in a higher gas temperature in the furnace and in the remaining parts of the heat absorbing surfaces of the steam boiler. A steam superheater, which in a gas and steam plant is placed in the boiler as near the furnace as possible in order to obtain as high a superheating temperature as possible at normal drive, i. e. without drawing off steam, would obtain too high a temperature at additional heating. If the superheater were placed in another zone in the boiler where the gas temperature is lower, a desired superheating temperature might be obtained at additional heating, but a lower superheating temperature would be obtained at drive without additional firing, resulting in a reduction of the thermal efficiency of the plant.

The present invention avoids the cited difficulties by dividing the superheater into separate parts, one of which, supplied with saturated steam from the boiler, is placed in the exhaust conduit from the gas turbine to the furnace of the steam boiler, and the other one, supplied with steam from the first superheater part and delivering it to the steam turbine, is placed in the steam boiler within a temperature zone in which, at normal drive without additional firing, the gas temperature is approximately the same as the steam temperature after the first superheater part.

By dividing the superheater and placing its respective parts in this manner the following advantages are obtained.

The first superheater part, which is dimensioned so as to give the steam the desired superheated temperature at drive without additional firing, fulfills its purpose on such occasion, and the other parts then remain inactive, the temperature difference between gases and steam which is a condition for the heat transmission to the superheater, being zero.

If it is now desired to draw off some steam for heating purposes and at the same time to maintain the power developed by the power plant unchanged, it is necessary to burn additional fuel in the furnace of the boiler and at the same time to increase the quantity of the feed water. In this case the steam quantity passing through the superheater becomes greater than at drive without drawing-off and the steam temperature after the first superheater part becomes lower. As at the same time, due to the additional firing, the gas temperature in the boiler rises, the other superheater part will have a temperature difference between gases and steam which results in heat transmission to the steam in this part of the superheater.

Calculations have shown that if the second superheater part is dimensioned in such manner that at a maximum of steam drawn-off for heating purposes a superheating temperature is obtained, which is approximately as high as at drive without draw-off, this temperature can be attained also for all intermediate values of the drawn-off steam, which results in a high steam turbine efficiency at all drive conditions.

The invention will be described hereinafter more in detail with reference to the accompanying drawing showing in more or less diagrammatic form a suitable embodiment of apparatus for carrying the invention into effect.

In the drawing the numeral 1 designates an air compressor which may be provided with an intercooler. The air compressed in the compressor is first preheated in a regenerator 4 by means of the waste gases to a temperature which may be controlled by a damper 5, and is then heated to the desired admission temperature in a combustion chamber 6. From the gas turbine 7 which drives the compressor 1 and an electric generator 8 normally delivering current to the auxiliary engines of the plant but also serving as starting motor at the starting of the plant, the exhaust gases are led to a combustion chamber 9 where they are reheated. By adjusting a damper 11, the exhaust gases from the turbine 7 can be led direct to the steam boiler 12 past the gas turbine 10.

After having been reheated in the combustion chamber 9, the exhaust gases work in the gas turbine 10 which via a gear 18 delivers power to a propeller, for example, then pass via the first superheater part 20 to steam boilers 12 where they give off the greatest part of their heat content, and further pass through an economizer 14 and a regenerator 4 before being discharged to waste through the smoke stack.

The generated steam is led from the steam collector of the boilers to the first superheater part 20, then passes to the second superheater part 13 and further to the steam turbine aggregate 15 and, after expansion in said aggregate, to a condenser 17 from which the condensate is raised to a so-called hotwell 22 by means of a pump device 21. A feed pump 23 pumps the condensate from the hotwell 22 via the economizer 14 to the steam boiler 12. In this embodiment an astern turbine is designated by 19, an additional burner by 24 and steam taps for heating purposes by 25.

Under different operating conditions, which in some cases call for additional fuel to be supplied to the boiler and in others do not, and which may call for different amounts of steam for power and for heating purposes, it may be desirable to by-pass one or the other of the parts of the superheater or to connect them in parallel with respect to steam flow and to this end the plant may advantageously be equipped with suitable conduits and valves for the purpose, as shown in Fig. 1. By means of conduit 26 and valves 27 and 28, the part 20 of the superheater can be by-passed. By means of conduit 29 and valves 30 and 31, the part 13 can be by-passed. Also by means of branch conduit 32 and valve 33 the parts can be connected in parallel, the by-pass conduit 26 being closed, by-pass conduit 29 being open and valve 31 closed.

We claim:

1. A power plant comprising a gas power section including compressor means, heating means and engine means for compressing, heating and expanding gaseous motive fluid comprising products of combustion; a steam power section including boiler means having a furnace and superheating means for generating superheated steam and engine means for expanding the same; conduit means for conducting hot exhaust gases from said gas power section to said boiler means to generate steam therein, fuel burning means in said furnace for selectively supplying additional heat to said boiler means, said superheating means being divided into at least two parts, a first part being located in advance of said fuel burning means to be traversed by the exhaust gases from said gas power section prior to delivery of the gases to the boiler means and a second part being located to be traversed both by gases from said gas power section and by gases generated by said fuel burning means, and means for extracting steam from said steam engine means after at least partial expansion thereof in the latter.

2. A plant as defined in claim 1 including conduit means connecting said first and second parts of the superheating means for flow of steam therethrough in the order named.

3. A plant as defined in claim 2 including additional conduit and valve means for selectively connecting said superheater parts in parallel with respect to steam flow.

4. A plant as defined in claim 2 including additional conduit and valve means for selectively by-passing one or the other of said superheater parts with respect to steam flow.

5. A plant as defined in claim 2 in which said first superheater part has sufficient area to alone superheat the steam to desired final temperature from heat derived from the gases exhausted from the gas power section.

6. A plant as defined in claim 5 in which said second superheater part is located in a zone in said boiler means in which the gas temperature resulting from operation of the boiler means solely with exhaust gases from the gas power section is approximately the same as the steam temperature of the steam discharged from said first superheater part.

7. A plant as defined in claim 5 in which said second superheater part has sufficient area to superheat to desired final temperature the increased steam supply generated by augmented feed water supply and operation of said fuel burning means to furnish the maximum required amount of extraction steam.

8. A plant as defined in claim 1 in which the capacity of the gas power section is sufficient to supply at least 50% of the maximum total heat required by said steam power section.

VILHELM FREDRIK ANDRÉ NORDSTRÖM.
DIMITRIJ ANDREJEVITCH MOROSOFF.

REFERENCES CITED

The following references are of record in the file of this patent:

UNITED STATES PATENTS

| Number | Name | Date |
|---|---|---|
| 1,948,538 | Noack | Feb. 27, 1934 |
| 1,978,837 | Forsling | Oct. 30, 1934 |
| 1,991,114 | Noack | Feb. 12, 1935 |
| 2,012,967 | Meininghaus | Sept. 3, 1935 |